Nov. 3, 1942.  V. C. HAMISTER ET AL  2,300,503
COMPOSITE ARTICLE
Filed Oct. 17, 1939

INVENTORS
VICTOR C. HAMISTER
NATHANIEL M. WINSLOW
BY Ed Greenewald
ATTORNEY

Patented Nov. 3, 1942

2,300,503

UNITED STATES PATENT OFFICE 2,300,503

COMPOSITE ARTICLE

Victor C. Hamister and Nathaniel M. Winslow, Lakewood, Ohio, assignors to National Carbon Company, Inc., a corporation of New York Application October 17, 1939, Serial No. 299,848

4 Claims. (Cl. 154—43)

The manufacture and use of porous carbon articles has increased considerably in recent years, as methods of manufacture have improved and as appreciation of the value of the chemical inertness, high thermal and electrical conductivity, and other unique characteristics of the material has spread.

Most of the uses of porous carbon require that it be held by a support which confines and at least partially surrounds the porous material. Although such support may at times be of wood, stoneware, or metal, most often it is composed of carbon in a relatively nonporous form.

It is difficult to fix a shaped article of porous carbon securely within a supporting member, by any means no more readily destructible than the porous carbon itself. Various cements may be used if the conditions of heat and corrosion are not severe; but none of the customary cements will survive the severe conditions to which porous carbon articles are not infrequently subjected.

The principal object of this invention is to provide a joint between a shaped porous carbon body and a support which confines and partially or wholly surrounds at least a part of said body, which joint is as durable as the porous carbon body. Further objects include the provision of a durable joint between two shaped bodies of any solid material, such as carbon, metal, or stoneware, wherein one body confines at least a part of the other body, and wherein each of the bodies may be of the same material as the other body, or of a different material.

Figure 1:
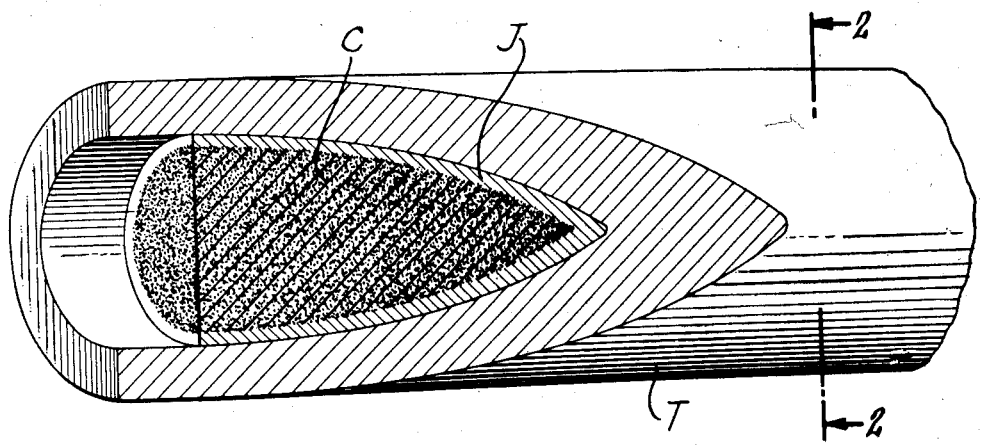
Figure 2:
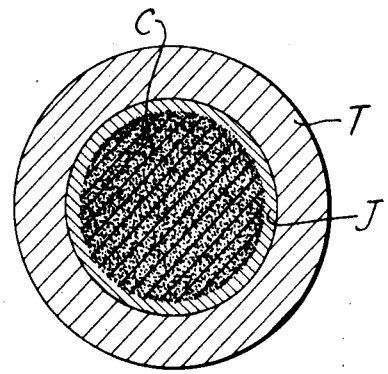

Other objects will become apparent from the following description and the accompanying drawing, in which:

Fig. 1 is a perspective view partially in section of an article embodying the invention; and Fig. 2 is a section taken on the line 2—2 of Fig. 1.

The essence of the invention lies in the use of "expanding" graphite in a joint. Several kinds of graphite, including Alabama natural graphites, Ceylon natural graphites, and a number of artificial graphites, when treated with a mixture of nitric acid and sulfuric acid become "expanding" graphite. The term "expanding graphite" as used herein and in the appended claims means graphite which has been subjected to such treatment. When expanding graphite is heated at a suitable temperature, for instance one-half hour at 500° C., its volume increases considerably, usually to at least twice its original volume. The term "expanded graphite" as used herein means graphite which has been subjected to treatment with acid and then heated.

In accordance with the invention, the two bodies to be joined are placed in the position desired, one body embraced by the other, with unexpanded expanding graphite between the two. The graphite is then heated until it is sufficiently expanded to form a tight and durable joint. The unexpanded graphite may be placed between the two bodies to be joined by first applying a smooth layer of an adhesive such as dextrine or glue upon either or both of the bodies and, before such adhesive has dried, applying a layer of the graphite. Sometimes it may be desirable to apply several alternate layers of adhesive and unexpanded graphite. The adhesive is decomposed by the heat applied to expand the graphite.

A joint formed according to the method described has good conductivity for heat and electricity, remains stable at elevated temperatures and is substantially less permeable to fluids than porous carbon. Such a joint may be formed between two shaped bodies of any solid material, such as carbon, metal, or stoneware, wherein one body partially or wholly surrounds at least a part of the other body. Each of the bodies may be of the same material as the other body, or of a different material.

The invention accordingly makes possible the preparation of composite articles of many types, comprising two shaped bodies one of which is embraced by the other. An example of an article embodying the invention is illustrated in partial section in Figs. 1 and 2 of the drawing. In this embodiment, a tube T, composed of relatively nonporous carbon, is provided with a core C composed of porous carbon, held within the tube T by a joint J comprising expanded graphite.

Other examples of composite articles embodying the invention include a filter plate held within a frame, and a rectangular or curvilinear trough provided with a core. In whatever form such articles may take, the space between the enclosed member and the enclosing member is occupied by expanded graphite.

We claim:

1. Composite article comprising at least two shaped bodies, one of such bodies confining the other of such bodies and being joined thereto by expanded graphite.

2. Composite article comprising at least one shaped body confined by another shaped body, at least one of such bodies being composed of porous carbon, the confined body being joined to the confining body by expanded graphite.

3. Composite article comprising at least two shaped members, one of such members being composed of porous carbon, the other of such members being composed of nonporous material confining the porous carbon member and being joined to such member by expanded graphite.

4. Composite article comprising a core of porous carbon, a tube of nonporous carbon confining said core, and expanded graphite rigidly joining said tube to said core.

VICTOR C. HAMISTER.
NATHANIEL M. WINSLOW.